United States Patent [19]

Peacey et al.

[11] Patent Number: 5,565,080
[45] Date of Patent: Oct. 15, 1996

[54] PREPARATION OF ANHYDROUS MAGNESIUM CHLORIDE-CONTAINING MELTS FROM HYDRATED MAGNESIUM CHLORIDE

[75] Inventors: John G. Peacey, Lancaster; Mark W. Kennedy, Porcupine; Thomas P. Walker, Roxboro, all of Canada

[73] Assignee: Noranda Metallurgy Inc., Ontario, Canada

[21] Appl. No.: 420,924

[22] Filed: Apr. 12, 1995

Related U.S. Application Data

[63] Continuation-in-part of Ser. No. 245,150, May 17, 1994, abandoned.

[51] Int. Cl.$^6$ ............................. C25B 1/24; C25C 3/04
[52] U.S. Cl. ..................... 205/359; 205/498; 205/404; 423/498
[58] Field of Search ................ 204/70; 423/498; 205/359, 498, 404

[56] References Cited

U.S. PATENT DOCUMENTS

| | | | |
|---|---|---|---|
| 3,067,006 | 12/1962 | Ebert et al. | 23/91 |
| 3,336,107 | 8/1967 | Kimberlin, Jr. | 423/498 |
| 3,742,100 | 6/1973 | Boyum et al. | 264/14 |
| 3,779,870 | 12/1973 | Gudmundsen et al. | 203/12 |
| 3,953,574 | 4/1976 | Toomey | 423/178 |
| 4,076,602 | 2/1978 | Wheeler | 204/70 |
| 4,083,943 | 4/1978 | Kinosz et al. | 423/498 |
| 4,269,816 | 5/1981 | Shackleton et al. | 423/498 |
| 4,302,433 | 11/1981 | Stein | 423/498 |
| 4,308,116 | 12/1981 | Andreassen et al. | 204/70 |
| 4,510,029 | 4/1985 | Neelameggham et al. | 204/130 |
| 4,560,449 | 12/1985 | Sivilotti | 204/70 |
| 4,981,674 | 1/1991 | Peacey | 423/498 |
| 5,089,094 | 2/1992 | Ogasawara et al. | 204/70 |

FOREIGN PATENT DOCUMENTS

| | | | |
|---|---|---|---|
| 120535 | 11/1945 | Australia. | |
| 32-9052 | 10/1957 | Japan. | |
| 0128327 | 6/1919 | United Kingdom | 423/498 |

OTHER PUBLICATIONS

Kirk–Othmer Encyclopedia, vol. 14, pp. 570–615. No date available.
Database WPI, Class 28, Accession No. 74–06868 (SU 380,746) Aug. 1973.

Primary Examiner—Kathryn Gorgos
Attorney, Agent, or Firm—Keck, Mahin & Cate

[57] ABSTRACT

In accordance with the present invention, there is now provided a process for the production an anhydrous magnesium chloride-containing melt or electrolyte containing very low levels of MgO, typically less than 0.2% by weight MgO, directly from hydrated magnesium chloride feeds. More specifically, the process comprises the steps of a) feeding hydrated magnesium chloride in a furnace containing molten electrolyte from a magnesium electrolysis cell to produce a melt, the temperature in the furnace being maintained between 450° and 65° C.; b) simultaneously injecting an anhydrous hydrogen chloride-containing gas into the melt in an amount below the stoichiometric requirement of 2 moles of HCl per mole of magnesium chloride produced from hydrated magnesium chloride, and agitating the melt to keep any magnesium oxide in suspension in them melt, to dehydrate the magnesium chloride and react with the MgO in the melt so that the melt contains not more than 0.2% MgO on a 100% magnesium chloride equivalent basis, to form an enriched anhydrous magnesium chloride containing melt.

15 Claims, 1 Drawing Sheet

MELT CHLORINATOR TEST APPARATUS

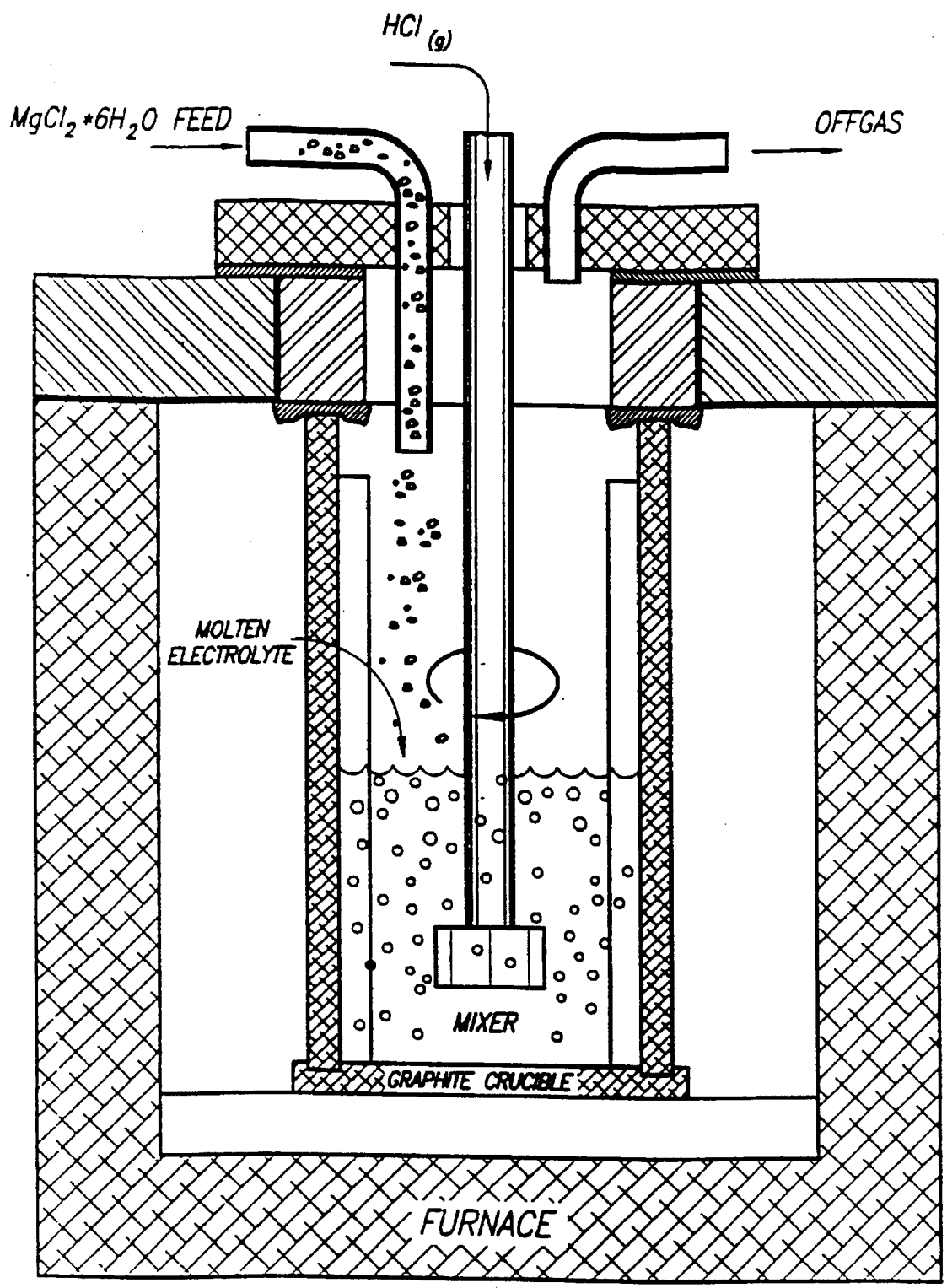
MELT CHLORINATOR TEST APPARATUS

PREPARATION OF ANHYDROUS MAGNESIUM CHLORIDE-CONTAINING MELTS FROM HYDRATED MAGNESIUM CHLORIDE

CROSS-REFERENCE TO RELATED APPLICATIONS

This application is a continuation-in-part of Application Ser. No. 08/245,150, filed May 17, 1994, now abandoned.

FIELD OF THE INVENTION

The present invention is concerned with a process suitable for the production of anhydrous magnesium chloride-containing melt as a starting material for obtaining magnesium metal by electrolysis; the process comprising the use of hydrated magnesium chloride, instead of the conventionally used anhydrous magnesium chloride.

BACKGROUND OF THE INVENTION

A key step in the production of magnesium metal by the electrolysis of magnesium chloride is the preparation of the anhydrous magnesium chloride feed. Several processes are used commercially to produce anhydrous magnesium chloride. The oldest is the process of IG Farben, wherein briquettes of MgO and coke are reacting with chlorine in an electrically heated vertical shaft furnace to produce molten magnesium chloride at about 800° C. Major drawbacks of this process include its low production activity (<30 tpd of molten $MgCl_2$ per furnace), periodic shutdowns required to remove unreacted residues from the bottom, high chlorine requirement, and the presence of chlorinated hydrocarbons in the exhaust gas.

U.S. Pat. No. 4,269,816 proposes a shaft furnace chlorination process producing molten anhydrous $MgCl_2$ directly from lump magnesite ore using CO as the reductant. This process has the advantage of eliminating the magnesite to MgO calcination and MgO/coke briquetting steps, but it requires a very pure magnesite teed to make magnesium metal of good quality, and it still has not resolved the remaining drawbacks of the IG Farben chlorinator, that is, low productivity and chlorinated hydrocarbon emissions.

Norsk Hydro has developed a process for producing anhydrous $MgCl_2$ prills from concentrated $MgCl_2$ brines. This process is described in U.S. Pat. No. 3,742,100 and consists in a) evaporating $MgCl_2$ brine to a concentration of up to 55% $MgCl_2$; b) prilling the concentrated $MgCl_2$ brine to form prills of $MgCl_2.4$–$6$ $H_2O$ of suitable size for fluidized bed processing; c) fluidized bed dehydration with air at 200° C. to produce $MgCl_2.2H_2O$ powder; d) three-stage fluidized bed dehydration with anhydrous HCl gas at about 300° C. to give anhydrous $MgCl_2$ powder containing less than 0.2% each by weight of MgO and $H_2O$. This process is operating commercially but requires recirculation of very large mounts of HCl gas, for example up to 50 times the stoichiometric requirement for dehydration, and, hence, is very complex and capital intensive.

U.S. Pat. No. 3,953,574 discloses a process that produces molten $MgCl_2$ by reacting spray-dried $MgCl_2$ powder containing about 5% by weight each of MgO and $H_2O$, with a solid carbonaceous reductant and chlorine gas at a temperature of 800° C. The process is carried out in two in-series rectangular furnaces, heated electrically via graphite electrodes installed in the furnace walls. Spray-dried $MgCl_2$ is fed with a solid carbon reductant into the first furnace and chlorine gas is bubbled through both furnaces using graphite lances to react MgO and $H_2O$ in the feed to $MgCl_2$ and HCl respectively. The final $MgCl_2$ melt contains less than 0.5% MgO. However, it has been found that in order to obtain sufficiently high chlorine utilization efficiencies, it is necessary to provide ferrous chloride to the melt either by adding an iron metal or oxide to the chlorination furnace or preferably by adding ferrous chloride solutions to the $MgCl_2$ brine before spray drying. Without such iron additions, chlorine efficiencies of less than 40% were achieved which would be too low for a commercial process. However, the use of iron results in several drawbacks, namely, the residual iron level of 0.5% in the product $MgCl_2$ melt decomposes in the electrolytic cell to iron metal that accumulates as sludge and causes losses in cell operating efficiency. Also, part of the iron added volatilizes causing stack emission problems. The residual iron level in the $MgCl_2$ product from the above process is too high for use in modem, sealed electrolysis cells, and therefore, a bipolar pre-electrolysis operation had to be developed to bring the iron level down to less than 0.1% in order to use its $MgCl_2$ as a feed to such cells (U.S. Pat. No. 4,510,029).

In U.S. Pat. No. 4,981,674, a process for preparing anhydrous $MgCl_2$ is described. The d process comprises the steps of feeding spray-dried $MgCl_2$ powder, magnesite or magnesia powder into molten $MgCl_2$ in a furnace at a temperature of 750°–850° C.; and adding gaseous reactants like chlorine and carbon monoxide through a gas disperser located within the molten $MgCl_2$ bath to produce fine gas bubbles that will react with the MgO in the bath and reduce its level down to less than 0.1%.

Australian Patent 120,535 teaches feeding hydrated magnesium chloride into a separate chamber of molten electrolyte, containing 10–55% $MgCl_2$ at a temperature in excess of the normal electrolytic cell temperature of 725°–750° C., preferably 800°–850° C., to decompose magnesium hydroxy chloride and increase the $MgCl_2$ concentration in the separate chamber to a level up to 50% $MgCl_2$. Magnesium oxide formed during this process can be partially reacted by introducing a chloridizing agent, such as hydrochloric acid gas or carbon and chlorine into this chamber. Periodically, the $MgCl_2$-enriched electrolyte is transferred batchwise to the adjacent electrolysis chamber. Also, MgO-containing sludge formed in the chamber must be removed periodically by dredging. The process described in this patent operates at temperatures higher than 750° C. At such high temperatures, most of the hydrated $MgCl_2$ fed is hydrolyzed to MgO. If hydrogen chloride gas is used as the chloridizing agent, large quantities of gas are required at such high temperatures to reduce the MgO level in the electrolyte to levels sufficiently low for modem, sealed electrolysis cells. The quantity of dry HCl required is well in excess of the 2 moles of HCl per mole of $MgCl_2$ in the hydrated $MgCl_2$ feed available from the chlorine produced by the electrolysis of magnesium chloride. Hence, the HCl gas must be recycled through a complex, drying system, such as that described in U.S. Pat. No. 3,779,870; the latter system being very expensive to install and operate. This process is also not applicable to modem, sealed magnesium electrolysis cells as it does not reduce the MgO level in the $MgCl_2$-enriched electrolyte to a level sufficiently low, that is, typically less than or equal to 0.1% MgO on a 100% $MgCl_2$ feed basis, to ensure economic cell operation. Also, removal of MgO containing sludge from electrolyte is an unpleasant and inefficient process.

Japanese Patent 32-9052 describes the feeding of hydrated magnesium chloride to a magnesium chloride-containing electrolyte (25% $MgCl_2$) while introducing dry HCl gas at a temperature of 750° C. Without dry HCl gas, 22% of the MgCl$_2$ introduced reacted with the moisture in the feed to form MgO. In the various examples given, it is stated that MgO formation is almost completely prevented when injecting HCl at levels equivalent to and slightly higher than the 2 moles of HCl per mole of MgCl$_2$ in the hydrated MgCl$_2$ feed to be produced from the chlorine from the subsequent electrolysis of the MgCl$_2$ formed. However, subsequent electrolysis of the MgCl$_2$-electrolytes gave graphite consumption levels in the range of 13–15 kg graphite/toe magnesium metal produced. This is 20 to 30 times greater than the maximum permissible graphite consumption in a modem, sealed magnesium electrolysis cell. Therefore, although the patent states that there is substantially no MgO in the electrolyte, the graphite consumption suggests otherwise, that is, a high MgO level. This is highly likely since MgO readily settles out as a sludge if the electrolyte is not agitated efficiently, as would be expected if HCl gas was only bubbled in, as shown in the FIG. 2 of the Japanese patent. The resulting MgO sludge at 750° C. is still fluid, and it can therefore be easily resuspended by the circulating electrolyte. Thus, the process as described in this patent, is not capable of supplying in MgCl$_2$ electrolyte containing loss than 0.1% MgO.

Modem magnesium electrolysis cells, such as the Norsk Hydro monopolar cell (U.S. Pat. No. 4,308,116) and the Alcan multipolar cell (U.S. Pat. No. 4,560,449), are referred to by those skilled in the an as "sealed" cells, since they are very tightly sealed to prevent the ingress of moist air. These so-called sealed cells are designed to operate for several years without stopping the cell operation. Accordingly, the graphite anodes cannot be changed and the sludge cannot be removed from the cell without closing the cell down. Since the rebuilding of sealed cells is very costly, it is imperative that the starting material fed to the cell, namely anhydrous magnesium chloride, contains very low levels of MgO, preferably less than 0.1% by weight. This is motivated by the fact that the MgO present in the feed or formed in the cell by the ingress of moist air will either react with the graphite anodes to consume graphite or form a magnesium-oxide containing sludge.

Commercial MgCl$_2$ electrolysis cells operate typically with a MgCl$_2$ level in the molten electrolyte in the range of 10–20% MgCl$_2$ with the remainder of the electrolyte comprising a mixture of NaCl, CaCl$_2$ and KCl in various proportions depending on the purity of the MgCl$_2$ feed. A typical electrolyte composition is about 60% NaCl, 20% CaCl$_2$, 0–5% KCl and 15–20% MgCl$_2$.

Graphite consumption leads to an increase in the anode-to-cathode distance, resulting in an increased cell operating voltage required, thus causing an increase of power consumption per unit of magnesium produced. As a result, the cell must be shut down when either its power consumption per unit of magnesium becomes too high for continued economic operation, or the cell heat balance can no longer be maintained. Any sludge formed in a sealed cell sinks and eventually forms a concrete-like mass on the bottom of the cell If sludge formation is excessive, it will disrupt electrolyte flow in the cell sufficiently to close the cell.

It, therefore, becomes apparent that in view of the foregoing, hydrated magnesium chloride is not added to "sealed" cells because moisture reacts with either magnesium chloride or magnesium metal to form MgO, or reacts directly with the graphite anode to consume it. This is confirmed by an article from Dow Chemicals in Kirk-Othmer Encyclopedia, Volume 14, pages 570–615, wherein it is observed that the addition of hydrated magnesium chloride powder containing 1.5–2.0 moles H$_2$O per mole of MgCl$_2$, directly to a specially designed electrolysis cell results in the generation of MgO that forms sludge that must be removed manually from the cell daily to prevent a permanent build-up and subsequent interference with cell operating efficiency. A part of the moisture added in the feed also reacts with the graphite anodes, leading to a very high graphite consumption of about 0.1 ton graphite per ton of magnesium produced. To avoid cell operating disruptions due to this high graphite consumption, the Dow electrolysis cell is designed with consumable graphite anodes that are periodically lowered into the cell to maintain the same anode to cathode distance. The high graphite anode consumption in the Dow cell is a major cost and it also means that the Dow cell cannot be designed with a small anode to cathode distance. A high power consumption of over 15,000 kWh/ton Mg metal is, therefore, required, compared to only about 10,000 kWh/ton Mg for modem sealed cells. Further, the off-gas from the Dow cell is a dilute chlorine gas (less than 30% Cl$_2$) contaminated with high levels of H$_2$O, HCl, CO, CO$_2$, H$_2$ and N$_2$ that cannot be used to recover chlorine gas for recycle or sale, if required. Modem sealed cells produce a concentrated chlorine gas stream, containing more than 95% Cl$_2$.

Accordingly, there is a great need to develop a simple process for the production of magnesium metal from anhydrous MgCl$_2$ in sealed cells that would reduce to the minimum the consumption of the graphite anode, and significantly diminish the production of sludge in the cell Such process would certainly be of great benefit if the currently used anhydrous magnesium chloride could be replaced with hydrated magnesium chloride as the starting material, the latter being significantly less difficult to produce. Previous attempts to feed hydrated MgCl$_2$ into cell electrolyte as described in Australian patent 120,535 and Japanese patent 32-9052 use temperatures of 750° C. or higher and do not produce MgCl$_2$-containing electrolyte with the very low levels of MgO needed and without eliminating undesirable sludge formation. Also, it is very important to reduce the HCl requirement to significantly less than 2 moles of HCl per mole of magnesium chloride produced from hydrated magnesium chloride that could be produced from the chlorine gas from the electrolysis cell, such that costly HCl gas drying and recirculating systems do not have to be used.

IN THE DRAWING

The FIGURE illustrates a melt chlorinator reactor suitable for the purposes of the present invention.

SUMMARY OF THE INVENTION

In accordance with the present invention, there is now provided a process for the production of an anhydrous magnesium chloride-containing melt or electrolyte containing very low levels of MgO, typically less than 0.2% by weight MgO, directly from hydrated magnesium chloride feeds. More specifically, the process comprises the steps of:

feeding hydrated magnesium chloride in a furnace containing molten electrolyte from a magnesium electrolysis cell to produce a melt, the temperature in the furnace being maintained between 450° and 650° C.;

simultaneously injecting an anhydrous hydrogen chloride-containing gas into the melt in an amount lower than the stoichiometric requirement of 2 moles of HCl per mole of magnesium chloride produced from the hydrated magnesium chloride, and agitating the melt to disperse the injected gas and keep any magnesium oxide in suspension in the melt to dehydrate the magnesium chloride and react with the magnesium oxide so that the melt contains not more than 0.2% MgO on a 100% magnesium chloride equivalent basis, to form an enriched anhydrous magnesium chloride containing melt which will be used as the electrolyte in the $MgCl_2$ cell.

In another aspect of the present invention, there is provided a process for producing magnesium metal by electrolysis comprising the steps of:

feeding hydrated magnesium chloride into a separate furnace containing molten electrolyte from a magnesium electrolysis cell to produce a melt; the temperature in the furnace being maintained between 450° and 650° C., until a level of magnesium chloride of 15–60% by weight is reached in the melt;

simultaneously injecting anhydrous hydrogen chloride containing gas in the furnace in an amount lower than the stoichiometric requirement of 2 moles of HCl per mole of magnesium chloride produced from the hydrated magnesium chloride and agitating the melt to disperse the injected gas and keep any MgO in suspension in the melt, to alehydrate the magnesium chloride feed and reduce the level of magnesium oxide present in the melt to less than 0.2% on a 100% magnesium chloride equivalent basis;

pumping the alehydrated magnesium chloride-containing melt into at least one electrolytic magnesium cell; and recovering the magnesium metal by electrolysis.

The molten electrolyte is recycled from the electrolytic cell to the furnace to control the concentration of $MgCl_2$ in the electrolyte.

In another aspect of the present invention, there is provided a process for the production of magnesium metal by electrolysis directly from hydrated magnesium chloride feeds, comprising the steps of:

feeding hydrated magnesium chloride in a compartment of a magnesium electrolysis cell containing molten electrolyte, to produce a melt, the temperature of the cell being maintained between 450°–650° C.;

simultaneously injecting anhydrous hydrogen chloride-containing gas via dispersing means in an amount below the stoichiometric requirement of 2 moles of HCl per mole of magnesium chloride produced from the hydrated magnesium chloride, to alehydrate the magnesium chloride feed and keep any magnesium oxide in suspension in the melt, to reduce the level of magnesium oxide present in the electrolyte to less than 0.2% on a 100% magnesium chloride basis, whereby the action of the disperser is sufficient to cause the melt to transfer into the electrolysis cell;

recovering magnesium metal by electrolysis.

Preferably, the level of magnesium oxide in the melt in the above processes is 0.1% or less on a 100% magnesium chloride basis.

DETAILED DESCRIPTION OF THE INVENTION

It is the object of the present invention to provide a new process for producing an anhydrous magnesium chloride-containing melt or electrolyte containing less than 0.2% by weight MgO, preferably 0.1% or less, directly from hydrated magnesium chloride feeds. The process operates at temperatures of from 450°–650° C., requires less than the stoichiometric amount of 2 moles of dry HCl gas available from the cell chlorine per mole of magnesium chloride produced from hydrated magnesium chloride, and produces an enriched $MgCl_2$ electrolyte suitable for modem, sealed electrolysis cells, containing less than 0.2% MgO, preferably 0.1% or less, on a 100% $MgCl_2$ equivalent basis, thus eliminating any sludge formation or need for its removal. The hydrated magnesium chloride feeds used in the process of the present invention may contain as much as 2.5 moles $H_2O$ per mole of $MgCl_2$. However, for commercial operation, a concentration of 1.0 to 2.0 moles $H_2O$ per mole $MgCl_2$ is preferred. Also, spray-dried magnesium chloride, containing approximately 5% by weight of $H_2O$ and 5% by weight of MgO, can also be utilized.

It has been found that by feeding hydrated magnesium chloride directly into a chloride-melt containing 15–60% $MgCl_2$ at a temperature in the range 450°–650° C., depending on the melting point of the melt, the formation of MgO can be virtually eliminated by the addition of anhydrous hydrogen chloride-containing gas to control the HCl-$H_2O$ partial pressure in a prescribed range. Further, it has been found that any MgO contained in the hydrated $MgCl_2$ feed or already present in the melt due to other reactions rapidly reacts with HCl containing gas, thus significantly reducing the concentration to less than 0.2% MgO by weight.

The present invention can be carried out by either:

(1) feeding hydrated $MgCl_2$ into a separate furnace containing molten electrolyte from the electrolysis cell, the temperature in the furnace being maintained between 450°–650° C. to produce a melt in which anhydrous hydrogen chloride-containing gas is injected in an mount below the stoichiometric requirement of two moles of HCl per mole of magnesium chloride produced from hydrated magnesium chloride, via a disperser such as the one disclosed in U.S. Pat. No. 4,981,674, which is hereby incorporated by reference, to give an enriched anhydrous $MgCl_2$ melt containing less than 0.2% MgO by weight, which is recirculated back to the electrolytic cell. Several electrolytic cells may be connected to each dehydration furnace. Similarly, each dehydration furnace may contain several dispersers; or (2) feeding hydrated $MgCl_2$ directly to a specially-designed compartment of a magnesium electrolysis cell containing electrolyte from the cell and maintained at a temperature of 450°–650° C. in which anhydrous hydrogen chloride-containing gas is introduced in an amount below the stoichiometric requirement of two moles of HCl per mole of magnesium chloride produced from hydrated magnesium chloride, using a gas disperser as described above. In addition to dispersing the injected gas mixture, the disperser also pumps melt into the reaction section and pumps $MgCl_2$-enriched melt out into the main part of the electrolysis cell.

This invention is not limited to injecting the anhydrous hydrogen chloride gas through the described gas dispersers. Part of the hydrogen chloride gas may also be introduced via simple spargers, porous plugs or other well-known devices for injecting gases into liquids. Sufficient mixing must, however, be provided to ensure that any MgO that may be present in the melt does not settle down and form a sludge. Preferably, the hydrogen chloride gas is dispersed into the melt to maintain the required HCl.$H_2O$ partial pressure therein. Depending on the concentration of $MgCl_2$ in the melt, the HCl.$H_2O$ partial pressure ratio is preferably from 0.5 to 1.5.

Instead of using anhydrous hydrogen chloride-containing gas as the chlorination agent, it may also be possible to inject hydrogen gas, or a hydrogen-containing gas like methane, propane, ammonia and the like, and chlorine gas separately into the media. Hydrogen and chlorine then react as they exit the disperser to form anhydrous hydrogen chloride in the melt. The advantage of in situ generation of hydrogen chloride is that it eliminates the cost of a separate hydrogen chloride gas generation furnace and the exothermic reaction to form hydrogen chloride gas reduces the heat requirement for the process.

Based on the experimental data currently available, the production costs of magnesium metal through the process of the present invention are significantly reduced when compared to the other processes used in the industry.

The process of the present invention will now be embodied by the following examples which are provided to illustrate the invention rather than limit its scope. All the percentages are by weight.

EXAMPLE 1

The equipment used in the laboratory tests is shown in FIG. 1. $MgCl_2.6H_2O$ powder is continuously fed at a rate of about 20 g/minute into a magnesium chloride-containing melt (initial weight=3.0–3.5 kg). The batch tests results at various HCl gas flowrates are summarized in Table 1.

TABLE 1

EFFECT OF HCl FLOWRATE ON MgO FORMATION

| | HCl Flowrate (L/min) | | | | | | | |
|---|---|---|---|---|---|---|---|---|
| | 2(0.15$^2$) | | | 5(0.375$^2$) | | | 10(0.75$^2$) | |
| Time | % in melt | | % $H_2O^1$ | % in melt | | % $H_2O^1$ | % in melt | | % $H_2O^1$ |
| (min) | $MgCl_2$ | MgO | reacting | $MgCl_2$ | MgO | reacting | $MgCl_2$ | MgO | reacting |
| 0 | 19.3 | 0.29 | | 18.9 | 0.28 | | 18.0 | 0.41 | |
| | | | 4.7 | | | 0 | | | 0 |
| 60 | 32.0 | 2.12 | | 30.2 | 0.19 | | 32.6 | 0.02 | |
| | | | | | | | | | 0 |
| 90 | — | — | 7.7 | 34.7 | 0.35 | 2.5 | 34.9 | 0.02 | |
| | | | | | | | | | 1.2 |
| 120 | 44.5 | 5.14 | | 41.5 | 0.99 | | 43.0 | 0.23 | |
| | | | 7.7 | | | 6.3 | | | 1.7 |
| 240 | 52.4 | 7.46 | | 53.6 | 4.07 | | 52.3 | 1.06 | |

$^1$Estimated % $H_2O$ in $MgCl_2.6H_2O$ feed reacting to form MgO via reaction $MgCl_2 + H_2O \rightarrow MgO + H_2O$ in the respective time interval (e.g. 0–60 min).
$^2$HCl: $H_2O$ ratio The tests are carried out at a temperature of 620° C. using an initial melt composition of approximately: 18% $MgCl_2$, 53% NaCl, 23% $CaCl_2$, 6% KCl and $MgCl_2.6H_2O$, which is continuously fed at a rate of about 20 g/rain into the melt. The initial melt also contained 0.2–0.4% MgO. Melt samples are taken regularly throughout the tests. After about 4 hours of operation, the tests were stopped. The final melt composition is typically about: 53% $MgCl_2$, 30% NaCl, 15% $CaCl_2$, 3% KCl. The test results show that at a HCl gas flowrate of 2 L/min and a HCl:$H_2O$ ratio=0.15, the MgO content of the melt increased steadily throughout the test to a final level of about 7.5% MgO. Calculations show that 5–8% of the $H_2O$ in the feed reacted to form MgO. At an HCl gas flowrate of 5 L/min, HCl:$H_2O$ ratio=0.375, no MgO is formed in the melt during the first 60–90 minutes of the test or until the $MgCl_2$ level in the melt had increased to about 30–35% $MgCl_2$. Above 35% $MgCl_2$ in the melt, increasing significant levels of MgO are formed in the melt. At an HCl gas flowrate of 10 L/min, HCl:$H_2O$ ratio=0.75, the initial MgO level in the melt (0.41% MgO) is quickly reduced to very low levels (0.02% MgO) and the MgO level in the melt does not increase above this low level until the $MgCl_2$ level in the melt exceeds 35% $MgCl_2$. Even then, only 1–2% of the $H_2O$ contained in the feed react to form MgO. This test shows that the use of HCl gas injected into a $MgCl_2$-containing melt not only prevents the reaction of $H_2O$, contained in a hydrated $MgCl_2$ feed material to form MgO but also, under certain conditions, can react any MgO contained in the melt down to extremely low levels (<0.02% MgO at 25% $MgCl_2$ in electrolyte).

Table 2 below shows that the process can also be operated at a much higher $MgCl_2$ concentration in the range 40–60% $MgCl_2$ and at temperatures as low as 500° C. or lower without generating significant levels of MgO in the melt phase. Also, the required molar ratio of HCl gas to $H_2O$ in the $MgCl_2$-containing feed material to prevent MgO formation is still low in the range 0.4–2.0, depending on the melt temperature and composition.

TABLE 2

| Time | % $MgCl_2$ in melt | % MgO in melt | % $H_2O$ reacting |
|---|---|---|---|
| 0 | 41.3$^1$ | 0.18 | |
| | | | 0.9 |
| 15 | 43.2 | 0.25 | |
| | | | 2.7 |
| 30 | 45.8 | 0.45 | |

TABLE 2-continued

| Time | % $MgCl_2$ in melt | % MgO in melt | % $H_2O$ reacting |
|---|---|---|---|
| | | | 1.2 |
| 45 | 47.6 | 0.53 | |
| | | | 1.2 |
| 60 | 50.1 | 0.61 | |
| | | | 2.3 |
| 90 | 53.2 | 0.90 | |
| | | | 2.6 |
| 120 | 56.0$^2$ | 1.20 | |

$^1$Initial melt: 37.6% NaCl; 19.0% CaCl; 4.0% KCl, remainder $MgCl_2$
$^2$Final melt: 28.1 NaCl; 16.0% $CaCl_2$; 3.2% KCl, remainder $MgCl_2$ Temperature = 500° C.
HCl:$H_2O$ ratio = 0.75

Remarkably, it has also been found that the reaction of HCl gas with MgO already present in a $MgCl_2$-melt is very fast even at temperatures as low as 500° C.

Table 3 shows that the MgO-contained in a 56% $MgCl_2$-containing melt is quickly reacted down to 0.02% in less than 45 minutes at a temperature of 500° C. This reaction is much quicker than the reaction of MgO in $MgCl_2$-containing melts with carbonaceous reactants and chlorine gas, that do not proceed at commercially acceptable rates below about 730° C.

TABLE 3

Comparison of MgO reaction with HCl gas versus $CO + Cl_2$

| Reactant | HCl | $CO + Cl_2$ | | |
|---|---|---|---|---|
| Temperature (°C.) | 500 | 730 | 770 | 820 |
| Time (hours) | 0.75 | 0.75 | 0.75 | 0.75 |
| Initial MgO | 1.20 | 8.33 | 1.59 | 4.28 |
| Final MgO | 0.02 | 7.93 | 0.30 | 0.42 |
| Moles MgO reacted | 1.63 | 0.55 | 1.74 | 5.49 |
| Moles HCl injected | 20.2 | — | — | — |
| Moles $Cl_2$ injected | — | 6.0 | 6.0 | 13.5 |
| Moles CO injected | — | 6.2 | 6.2 | 13.7 |
| HCl efficiency (%) | 16.4 | — | — | — |
| $Cl_2$ efficiency (%) | — | 9.2 | 29.0 | 40.7 |
| Overall MgO reaction rate (mol/L/H) | 0.62 | 0.21 | 0.66 | 0.90 |

The effect of injecting HCl gas into $MgCl_2$-containing electrolyte without mixing or dispersion is shown in Table 4. With no mixing or dispersion, the HCl gas efficiency is less than 40% and the average ram of reaction is only about 2.5 mol MgO/h. Also, with no mixing or dispersion, MgO particles settle out as a sludge, so that although the melt samples indicate a low MgO content (0.1–0.5% MgO by weight), there is actually a much higher level of MgO present in the reactor that would eventually build-up and have to be removed as sludge. A rotating a graphite impeller provides sufficient agitation to ensure all the MgO particles are kept in suspension. In the example given, rotating the impeller at 500 rpm increased the HCl gas efficiency to over 90% as well as increasing the reaction rate significantly to the range 4.5 to 6.4 mol MgO/h.

TABLE 4

Effect of Dispersion on Reaction of MgO with HCl Gas

| Melt temperature °C. | 650° C. | | 550° C. | |
|---|---|---|---|---|
| Disperser | 0 rpm | 500 rpm | 0 rpm | 500 rpm |
| Initial % $MgCl_2$ in melt | 22.5 | 24.7 | 44.1 | 48.9 |
| Initial % MgO in melt | 1.02 | 1.82 | 2.98 | 2.72 |
| Final % MgO in melt | 0.40 | 0.27 | 0.76 | 0.67 |
| Time (min) | 30 | 25 | 90 | 40 |
| Average HCl efficiency (%) | 38.2 | 96.1 | 33.8 | 92.7 |
| Average reaction rate (mol MgO/h) | 2.58 | 6.42 | 2.27 | 4.68 |

The following examples illustrate the need for operating temperatures well below 750° C. to avoid complex HCl gas drying and recirculation to the chlorination furnace when operating at $MgCl_2$ levels in the enriched electrolyte above 25% $MgCl_2$.

EXAMPLE 2

Magnesium chloride dihydrate, containing 1% MgO is fed to a chlorination furnace. The initial $MgCl_2$ level in the electrolyte is about 20% $MgCl_2$, which is similar to that in the electrolysis cell Magnesium chloride dihydrate is fed into the chlorination furnace at a fixed rate of 31.6 kg/min for 30 minutes and dry HCl gas is injected at a rate to prevent or minimize the formation of MgO in the electrolyte. After 30 minutes, the level of $MgCl_2$ in the electrolyte has risen to about 45% $MgCl_2$. Feeding of the dihydrate is then stopped and dry HCl gas is continued to be injected but at a lower rate for another 20 minutes to reduce the residual MgO level in the electrolyte to less than 0.02% MgO. The 45% $MgCl_2$ electrolyte, containing less than 0.02% MgO, is then transferred to an electrolytic cell.

The dry HCl gas requirements for this test operating at 550° C. and 750° C. are compared in Table 5 below.

TABLE 5

Comparison of HCl Requirements for Producing 45% $MgCl_2$ Electrolyte at 550° C. and 750° C.

| | Temperature (°C.) | |
|---|---|---|
| | 550 | 750 |
| $MgCl_2.2H_2O$ feed rate (kg/min) | 31.6 | 31.6 |
| Equilibrium $HCl:H_2O$ ratio for not producing MgO at 45% $MgCl_2$ concentration | 0.4 | 2.3 |
| HCl gas flowrate (L/min) while feeding dihydrate | 108 | 620 |
| HCl gas flowrate (L/min) to reduce MgO level to ≦0.01% MgO | 40 | 40 |
| Total HCl gas used (L/min). | 4040 | 19400 |
| Stoichiometric amount of HCl gas available from $Cl_2$ gas from electrolysis cell (L/min) | 5410 | 5410 |
| Percentage of cell $Cl_2$ required for HCl gas | 74.7 | 358.6 |

Thus, by operating the chlorination furnace at 550° C., 45% $MgCl_2$ electrolyte, containing less than 0.1% MgO on a 100% $MgCl_2$ equivalent basis, can be produced using less than the stoichiometric equivalent amount of HCl gas. At 750° C., the reaction requires over 3 times the stoichiometric equivalent amount of HCl gas, which means that the wet HCl gas from the chlorination furnace must be recovered, cooled, dried and recirculated back to the chlorination furnace.

The present process described can also be operated in a continuous mode. In this mode, a two-stage chlorination furnace is required. In the first stage, hydrated magnesium chloride and molten electrolyte from the electrolysis cell at about 15–20% $MgCl_2$ are continuously added to the melt to give the desired enriched $MgCl_2$ electrolyte, in the range 25–45% $MgCl_2$. Dry HCl gas is injected into the first stage at such a rate as to minimize the formation of MgO. The HCl gas in the first stage can be injected in various well-known means either lances, sparging tubes, porous plugs or rotating dispersers or a combination of the above. The resulting 45% $MgCl_2$ electrolyte containing 0.1–0.5% MgO then passes continuously to the second-stage furnace where dry HCl gas is injected via a rotating disperser to efficiently reduce the MgO level to less than 0.1% MgO on a 100% $MgCl_2$ equivalent basis. The HCl gas requirements for the continuous process operating at 550° C. and 750° C. are compared in Table 6 below.

TABLE 6

Operating Requirements for Two-Stage Continuous Chlorination Furnace at 550° C. and 750° C.

| | Temperature (°C.) | |
|---|---|---|
| | 550 | 750 |
| 1st Stage Furnace | | |
| $MgCl_2 \cdot 2H_2O$ feed rate, kg/min | 15.8 | 15.8 |
| HCl gas flowrate, L/min | 59 | 300 |
| 2nd Stage Furnace | | |
| HCl gas flowrate, L/min | 16 | 15 |
| Total HCl gas used, L/min | 4440 | 18900 |
| Total HCl gas used, L/min available from $Cl_2$ gas from electrolysis cell | 5410 | 5410 |
| Percentage of cell $Cl_2$ gas required for HCl gas (%) | 82.0 | 349.4 |

Table 7 shows the effect of temperature, in the range 550 to 750° C., and $MgCl_2$ concentration on the equilibrium $HCl/H_2O$ when feeding hydrated $MgCl_2$ into a $MgCl_2$ containing electrolyte (NaCl:$CaCl_2$ molar ratio=4.5:1).

TABLE 7

Effect of Temperature and $MgCl_2$ Concentration on the % Equilibrium $HCl/H_2O$ Ratio Required to Prevent MgO Formation

| | Temperature (°C.) | | |
|---|---|---|---|
| % $MgCl_2$ | 550 | 650 | 750 |
| 20 | 0.10 | 0.24 | 0.65 |
| 30 | 0.19 | 0.48 | 1.15 |
| 40 | 0.31 | 0.83 | 1.85 |
| 45 | 0.40 | 1.05 | 2.32 |
| 50 | 0.50 | 1.33 | 2.90 |

In practice, $HCl/H_2O$ levels up to about 50% higher than the equilibrium level is required to prevent excessive MgO formation. $MgCl_2$-brine solutions can be dried in hot air in a fluidized-bed drier to the dihydrate without forming excessive amounts of magnesium oxide ($\leq 1\%$ MgO). Assuming that a feed of magnesium chloride dihydrate and a maximum $HCl/H_2O$ ratio of 1.0 are possible without having to dry and recirculate HCl gas within the process, the maximum enrichment of $MgCl_2$ in the melt is not limited at 550° C., but at 650° C., it is limited to less than 45% $MgCl_2$, and at 750° C., it is limited to less than 30% $MgCl_2$. Since significant additional HCl is also required to reduce the residual MgO levels to less than 0.1% MgO on a equivalent 100% $MgCl_2$ basis, in practice, the maximum enrichment levels possible without drying and recycle of HCl gas is even further limited at temperatures higher than 650° C. Assuming 20% $MgCl_2$ in the electrolyte from the magnesium electrolysis cell, operation at low levels of $MgCl_2$ enrichment increases the volume of electrolyte that must be transferred from the electrolysis cell through the chlorination furnace and back and reduces the allowable level of MgO in the enriched electrolyte feed to the electrolysis cell. This is illustrated in Table 8 shown below:

TABLE 8

| % $MgCl_2$ from chlorinator | % $MgCl_2$ from cell | $\Delta$% $MgCl_2$ | Wt ratio enriched $MgCl_2$ melt to 100% $MgCl_2$ feed | Maximum allowable % MgO in enriched $MgCl_2$ melt |
|---|---|---|---|---|
| 21 | 20 | 1 | 80 | 0.0012 |
| 25 | 20 | 5 | 16 | 0.0063 |
| 30 | 20 | 10 | 8 | 0.0125 |
| 45 | 20 | 25 | 3.2 | 0.031 |

Since the reaction rate of residual MgO with HCl gas at MgO levels below 0.3–0.5% MgO is proportional to the concentration of MgO in the melt, the size of chlorination furnace required to produce a melt containing less than 0.01% MgO becomes very large. Therefore, it is preferable to operate at MgO levels above this and hence with % $MgCl_2$ bites of at least 5% and preferably 10% or higher.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for the production of anhydrous magnesium chloride-containing electrolyte directly from hydrated magnesium chloride feeds without substantially generating magnesium oxide in situ comprising the steps of:

feeding hydrated magnesium chloride in a furnace containing molten electrolyte from a magnesium electrolysis cell, the temperature in the furnace being maintained between 450° C. and 650° C.;

simultaneously injecting an anhydrous hydrogen chloride-containing gas into the electrolyte in an amount lower than the stoichiometric requirement of 2 moles of HCl per mold of magnesium chloride produced from the hydrated magnesium chloride, and agitating the electrolyte to disperse the injected gas and keep any magnesium oxide in suspension in the electrolyte to dehydrate the magnesium chloride and react with the magnesium oxide so that the electrolyte contains not more than 0.2% MgO on a 100% magnesium chloride equivalent basis, to form an enriched anhydrous magnesium chloride containing electrolyte.

2. A process according to claim 1 wherein the electrolyte does not contain more than 0.1% MgO on a 100% magnesium chloride equivalent basis.

3. A process according to claim 1 wherein the hydrated magnesium chloride is a spray-dried magnesium chloride.

4. A process according to claim 1 wherein the hydrated magnesium chloride contains up to 2.5 moles of water per mole of magnesium chloride.

5. A process according to claim 1 wherein the anhydrous hydrogen chloride-containing gas is replaced with a hydrogen-containing gas and a chlorine containing gas, which are injected simultaneously in the electrolyte.

6. A process according to claim 1 wherein the hydrated magnesium chloride contains up to 5% by weight of magnesium oxide.

7. A process according to claim 1 wherein the enriched anhydrous magnesium chloride electrolyte contains from 15 to 60% by weight of magnesium chloride.

8. A process according to claim 1 wherein HCl:H$_2$O partial pressure ratio in the gas phase is from 0.5 to 1.5.

9. A process according to claim 1 wherein the enriched anhydrous magnesium electrolyte is recirculated to one or more magnesium electrolysis cells.

10. A process for producing magnesium metal by electrolysis directly from hydrated magnesium chloride feeds, comprising the steps of:

feeding hydrated magnesium chloride into a separate furnace containing molten electrolyte from a magnesium electrolysis cell, the temperature in the furnace being maintained between 450° C. and 650° C. until a level of magnesium chloride of 15–60% by weight is reached in the electrolyte;

simultaneously injecting anhydrous hydrogen chloride containing gas in the furnace in an amount lower than the stoichiometric requirement of 2 moles of HCl per mole of magnesium chloride produced from the hydrated magnesium chloride and agitating the electrolyte to disperse the injected gas and keep any MgO in suspension in the electrolyte, to dehydrate the magnesium chloride feed and reduce the level of magnesium oxide present in the electrolyte to less than 0.2% on a 100% magnesium chloride equivalent basis;

pumping the dehydrated magnesium chloride-containing electrolyte into at least one electrolytic magnesium cell; and recovering the magnesium metal by electrolysis.

11. A process according to claim 10 wherein the level of magnesium oxide in the electrolyte is not more than 0.1% on a 100% magnesium chloride equivalent basis.

12. A process according to claim 10 wherein the anhydrous hydrogen chloride-containing gas is replaced with a hydrogen-containing gas and a chlorine containing gas, which are injected simultaneously in the electrolyte.

13. A process for the production of magnesium metal by electrolysis directly from hydrated magnesium chloride feeds, comprising the steps of:

feeding hydrated magnesium chloride in a compartment of a magnesium electrolysis cell containing molten electrolyte, the temperature of the cell being maintained between 450°–650° C.;

simultaneously injecting anhydrous hydrogen chloride-containing gas via dispersing means in an amount below the stoichimetric requirement of 2 moles of HCl per mole of magnesium chloride produced from the hydrated magnesium chloride, to dehydrate the magnesium chloride feed and keep any magnesium oxide in suspension in the electrolyte, to reduce the level of magnesium oxide present in the electrolyte to less than 0.2% on a 100% magnesium chloride basis, whereby the action of the disperser is sufficient to cause the electrolyte to transfer in the electrolysis cell;

recovering magnesium metal by electrolysis.

14. A process according to claim 13 wherein the level of magnesium oxide in the electrolyte is not more than 0.1% on a 100% magnesium chloride equivalent basis.

15. A process according to claim 13 wherein the anhydrous hydrogen chloride-containing gas is replaced with a hydrogen-containing gas and a chlorine containing gas, which are injected simultaneously in the electrolyte melt.

* * * * *